United States Patent [19]

Bobst

[11] Patent Number: 5,758,887
[45] Date of Patent: Jun. 2, 1998

[54] WHEELBARROW WITH INCREASED EFFICIENCY AND STABILITY

[76] Inventor: Glen L. Bobst, 2910 N. Saint Helena Way, Saint Helena, Calif. 94574

[21] Appl. No.: 553,949

[22] Filed: Nov. 6, 1995

[51] Int. Cl.$^6$ ........................................ B62B 1/18
[52] U.S. Cl. .......................... 280/47.31; 280/47.24; 301/114; 301/125
[58] Field of Search ............... 280/47.131, 47.15, 280/47.24, 47.2, 47.26, 47.31, 653, 42; 301/1, 7, 110.5, 114, 125; 298/2, 3, 5; 180/905, 906

[56] References Cited

U.S. PATENT DOCUMENTS

| | | | |
|---|---|---|---|
| 385,381 | 7/1888 | Spalding | 280/47.31 |
| 507,068 | 10/1893 | Elliott | 301/7 |
| 2,290,451 | 7/1942 | Schwinn | 301/110.5 |
| 2,389,294 | 11/1945 | Burke | 280/47.24 |
| 3,488,091 | 1/1970 | Baker | 280/47.31 |
| 3,756,548 | 9/1973 | Santarelli et al. | 280/47.31 |
| 3,827,269 | 8/1974 | Mueller | 280/47.31 |
| 5,026,079 | 6/1991 | Donze et al. | 280/47.31 |
| 5,033,760 | 7/1991 | Evans | 280/47.31 |
| 5,087,061 | 2/1992 | Wallace | 280/653 |

FOREIGN PATENT DOCUMENTS 15504  6/1897  United Kingdom ............... 301/110.5

*Primary Examiner*—Brian L. Johnson
*Assistant Examiner*—Min Yu

[57] ABSTRACT

The present invention relates to a wheelbarrow with an improved wheel assembly. The wheelbarrow includes brackets which are fixedly positioned with respect to the wheelbarrow adjacent to the front end thereof. An axle is formed of a rod with external threads, the axle having a center and opposed ends. Brackets are secured to the front legs adjacent to their lower extents with apertures for receiving the axle adjacent to its center. Cylindrical wheels are secured to the axle adjacent to the ends with tires thereon for rotation. Two internal bracket nuts are threadedly secured to the axle on opposite sides of the center in contact with the brackets at their internal faces. Two external wheel nuts are threadedly secured to the axle adjacent to their ends in contact with the wheels at their external faces. Intermediate nuts between the brackets and wheels are in contact with the external faces of the brackets and the internal faces of the wheels.

1 Claim, 3 Drawing Sheets

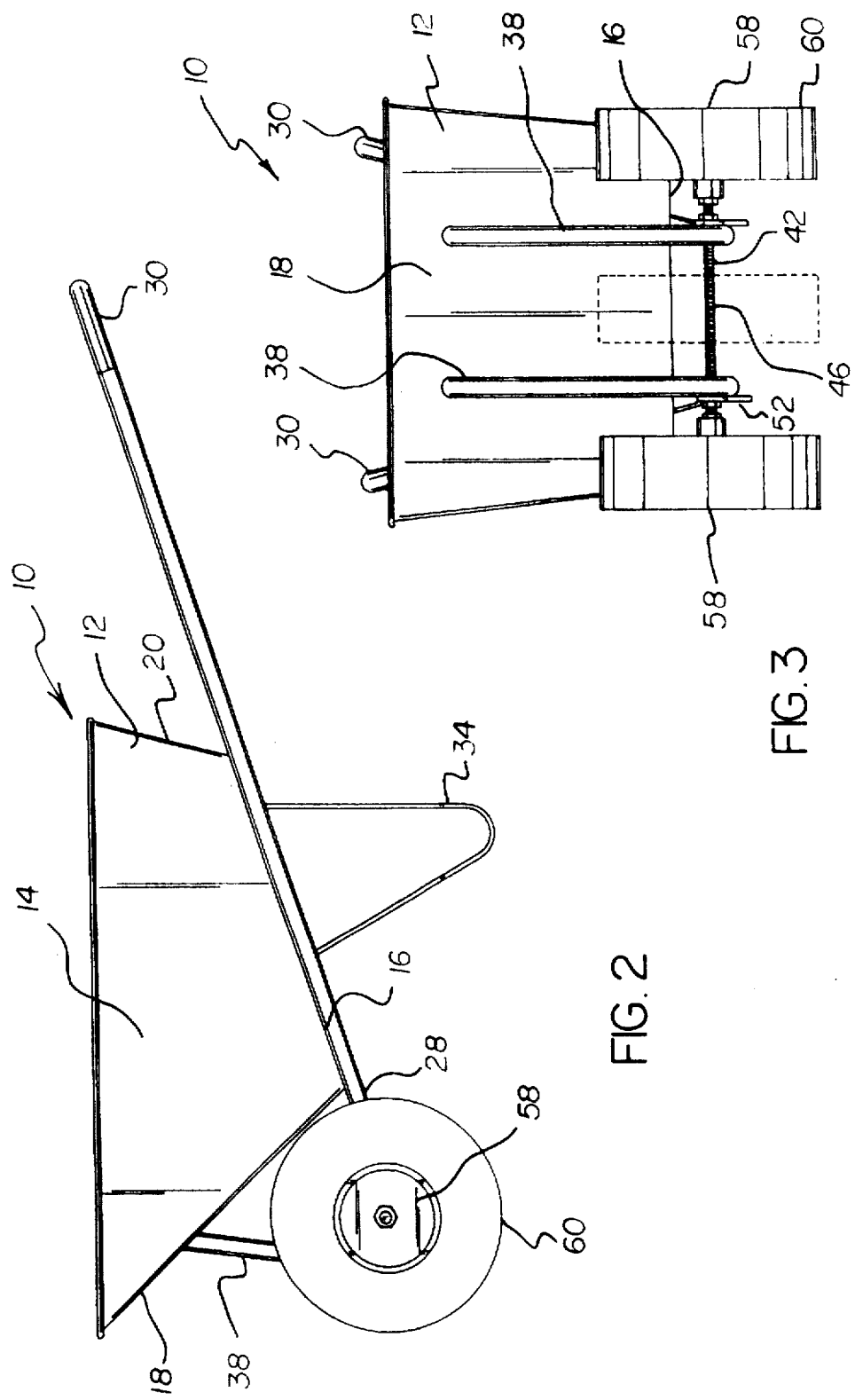

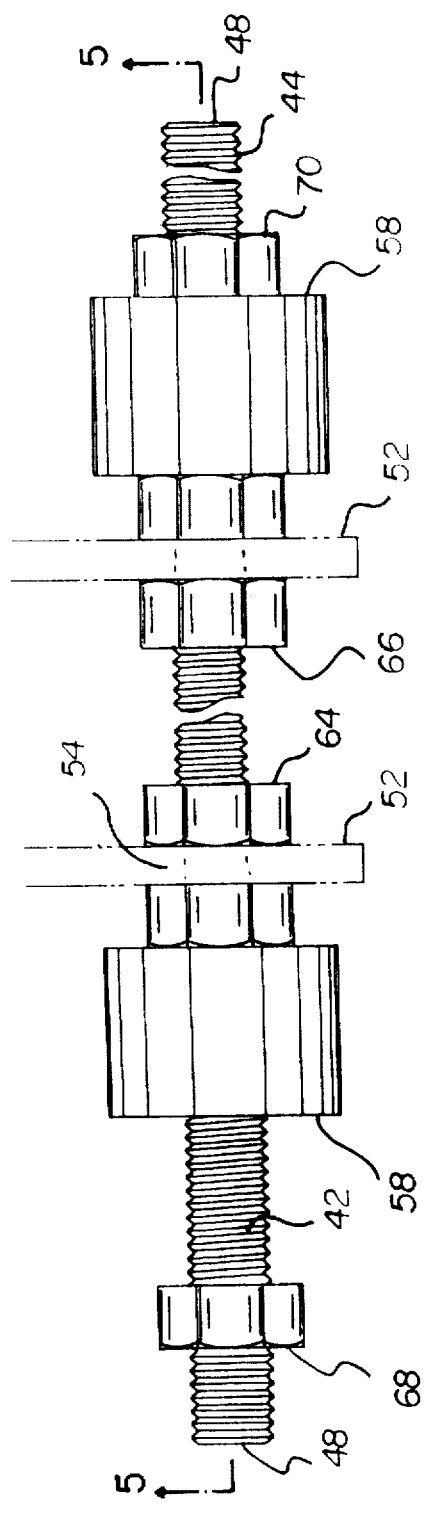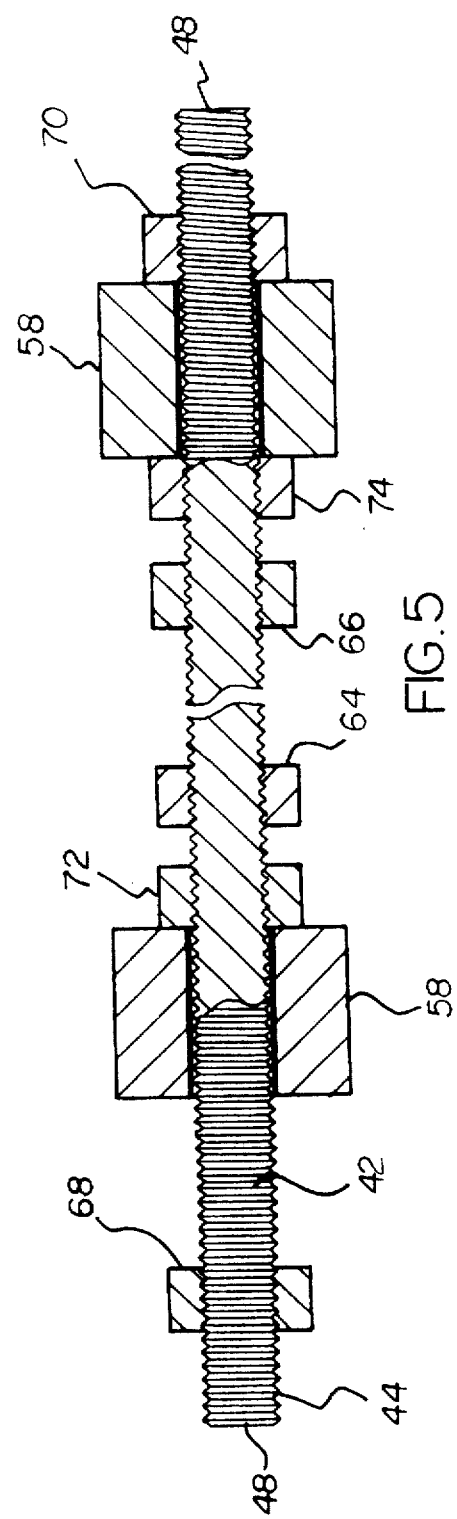

WHEELBARROW WITH INCREASED EFFICIENCY AND STABILITY

BACKGROUND OF THE INVENTION

1. Field of the Invention

The present invention relates to a new and improved wheelbarrow with increased stability and efficiency and, more particularly, pertains to utilizing two laterally spaced wheels removably secured to the front edge of a wheelbarrow.

2. Description of the Prior Art

The use of wheelbarrows of various designs and configurations is known in the prior art. More specifically, wheelbarrows of various designs and configurations heretofore devised and utilized for the purpose of improving the stability of vehicles with improved wheel structures of various methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of devices for utilizing two laterally spaced wheels removably secured to the front edge of a wheelbarrow. By way of example, U.S. Pat. No. 3,604,753 to Couture discloses a safety wheelbarrow with a secondary frame.

U.S. Pat. No. 4,252,334 to Filkins discloses a balanced wheelbarrow with a pair of wheels disposed at planar angles.

U.S. Pat. No. 4,261,590 to Schupbach discloses a wheelbarrow with a pair of subframes each made of a continuous length of tubular material.

U.S. Pat. No. 4,740,008 to Johnson discloses a convertible wheelbarrow cart for transportation behind a vehicle.

U.S. Pat. No. 5,026,079 to Donze et al. discloses a balanced multi-wheel wheelbarrow.

Lastly, U.S. Pat. No. Design. 329,726 to Travis discloses a dual wheeled wheelbarrow.

In this respect, the wheelbarrow with increased stability and efficiency according to the present invention substantially departs from the conventional concepts and designs of the prior art, and in doing so provides an apparatus primarily developed for the purpose of utilizing two laterally spaced wheels removably secured to the front edge of a wheelbarrow.

Therefore, it can be appreciated that there exists a continuing need for a new and improved wheelbarrow with increased stability and efficiency which can be used for utilizing two laterally spaced wheels removably secured to the front edge of a wheelbarrow. In this regard, the present invention substantially fulfills this need.

SUMMARY OF THE INVENTION

In view of the foregoing disadvantages inherent in the known types of wheelbarrows of various designs and configurations now present in the prior art, the present invention provides an improved wheelbarrow with increased stability and efficiency. As such, the general purpose of the present invention, which will be described subsequently in greater detail, is to provide a new and improved wheelbarrow with increased stability and efficiency and methods which have all the advantages of the prior art and none of the disadvantages.

To attain this, the present invention essentially comprises a new and improved wheelbarrow with increased stability and efficiency comprising, in combination, a container with side walls and a bottom wall having a front and a back and an open top; handles having lower ends coupled to the bottom of the container and upper ends holdable by a user; rear legs depending downwardly from the container adjacent to the rear end and positionable on the ground; front legs depending from the container adjacent to the front end; an axle formed of a rod with external threads, the axle having a center and opposed ends; brackets secured to the front legs adjacent to their lower extents with apertures for receiving the axle adjacent to its center; cylindrical wheels secured to the axle adjacent to the ends with tires thereon for rotation; two internal bracket nuts threadedly secured to the axle on opposite sides of the center in contact with the brackets at their internal faces; two external wheel nuts threadedly secured to the axle adjacent to their ends in contact with the wheels at their external faces; and intermediate nuts between the brackets and wheels in contact with the external faces of the brackets and the internal faces of the wheels.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wheelbarrow with increased stability and efficiency which has all the advantages of the prior art wheelbarrows of various designs and configurations and none of the disadvantages.

It is another object of the present invention to provide a new and improved wheelbarrow with increased stability and efficiency which may be easily and efficiently manufactured and marketed.

It is a further object of the present invention to provide a new and improved wheelbarrow with increased stability and efficiency which is of a durable and reliable construction.

An even further object of the present invention is to provide a new and improved wheelbarrow with increased stability and efficiency which is susceptible of a low cost of manufacture with regard to both materials and labor, and which accordingly is then susceptible of low prices of sale to the consuming public, thereby making such wheelbarrows of various designs and configurations economically available to the buying public.

Still yet another object of the present invention is to provide a new and improved wheelbarrow with increased stability and efficiency which provides in the apparatuses and methods of the prior art some of the advantages thereof, while simultaneously overcoming some of the disadvantages normally associated therewith.

Even still another object of the present invention is to utilize two laterally spaced wheels removably secured to the front edge of a wheelbarrow.

Lastly, it is an object of the present invention to provide a wheelbarrow with an improved wheel assembly. Brackets are fixedly positioned with respect to the wheelbarrow adjacent to the front end thereof. An axle is formed of a rod with external threads, the axle having a center and opposed ends. Brackets are secured to the front legs adjacent to their lower extents with apertures for receiving the axle adjacent to its center. Cylindrical wheels are secured to the axle adjacent to the ends with tires thereon for rotation. Two internal bracket nuts are threadedly secured to the axle on opposite sides of the center in contact with the brackets at their internal faces. Two external wheel nuts are threadedly secured to the axle adjacent to their ends in contact with the wheels at their external faces. Intermediate nuts between the brackets and wheels are in contact with the external faces of the brackets and the internal faces of the wheels.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side elevational view of the device shown in FIG. 1.

FIG. 3 is a front elevational view of the device shown in the prior Figure.

FIG. 4 is an enlarged front elevational view of the axle assembly and related components shown in FIGS. 1 and 3.

FIG. 5 is a cross-sectional view taken along line 5—5 of FIG. 4.

The same reference numerals refer to the same parts throughout the various Figures.

DESCRIPTION OF THE PREFERRED EMBODIMENT

Figure 1:
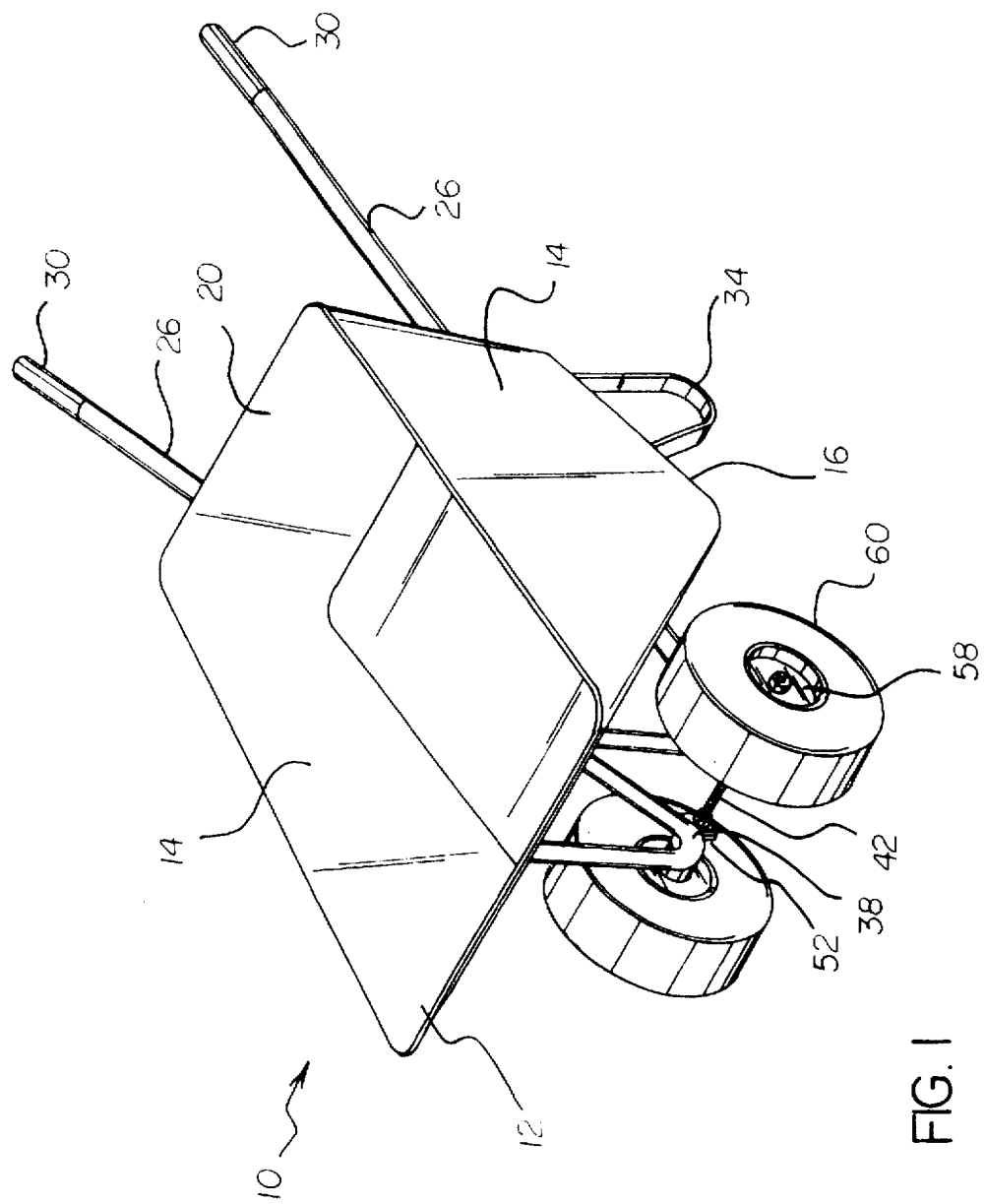
FIG. 1 is a perspective illustration of the preferred embodiment of the new and improved wheelbarrow with increased stability and efficiency constructed in accordance with the principles of the present invention.

With reference now to the drawings, and in particular to FIG. 1 thereof, the preferred embodiment of the new and improved wheelbarrow with increased stability and efficiency embodying the principles and concepts of the present invention and generally designated by the reference numeral 10 will be described.

The present invention, the new and improved wheelbarrow with increased stability and efficiency is a wheelbarrow 10 comprised of a plurality of components. In their broadest context, the components include a container, handles, rear legs, front legs, an axle, brackets, cylindrical wheels, bracket nuts, wheel nuts and intermediate nuts. Each of the individual components is specifically configured and correlated one with respect to the other so as to attain the desired objectives.

The wheelbarrow 10 is formed to have a container 12. The container has side walls 14, a bottom wall 16, a front wall 18 and a back wall 20. It also has an open top 22 into which contents to be transported may be positioned.

Next provided are a pair of handles 26. The handles are formed with lower ends 28 and upper ends 30. The lower ends are coupled to the bottom wall of the container. The upper ends extend upwardly beyond the back of the container. In this manner, they may be grasped by the user during operation and use.

Located on the container are a pair of rear legs 34. Such legs depend downwardly from the container from a location adjacent to the back of the container. Such legs are for positioning on the ground when the wheelbarrow is not being pushed. In addition to the rear legs, the wheelbarrow is also provided with front legs 38. The front legs depend from the container. They depend from a region adjacent to the front of the container.

Next provided is an axle 42. The axle is formed as a rod with external threads 44. The axle has a center 46. It also has opposed ends 48.

Coupling the front legs and the axle are a pair of brackets 52. The brackets are secured to the front legs adjacent to their lower extents. The brackets are formed with apertures 54 for receiving the axle. The axle is received adjacent to its center but on opposite sides thereof.

The next component of the wheelbarrow are wheels 58. The wheels are formed as cylindrical members secured to the axle. Such securement is adjacent to the ends of the axle. Tires 60 are positioned on the wheels. The tires are mounted with respect to the axle for rotation during operation and use.

Next provided are a plurality of nuts. The nuts include two internal bracket nuts 64,66. The bracket nuts are threadedly secured to the axle on opposite sides of the center. They are located in contact with the brackets at the internal faces of the brackets. Additional nuts include two external wheel nuts 68,70. Such wheel nuts are threadedly secured to the axle. Such securement is adjacent to the ends of the axle and in contact with the wheels at their external faces. The last nuts are the intermediate nuts 72,74. Such intermediate nuts are located between the brackets and the wheels. They are located with their internal faces in contact with the external faces of the brackets and with their external faces in contact with the internal faces of the wheel. In the preferred embodiment, a total of two intermediate nuts are located for contacting the two operating components of the system, the brackets and the wheels.

The present invention comprises a wheelbarrow which adds a second wheel unlike that of a conventional wheelbarrow which utilizes only one. Single-wheeled units have a tendency to tip over when heavily loaded. Converting to a two-wheeled model eliminates this problem.

To install the additional wheel, the existing axle and wheel are removed from in between the axle support brackets and a new longer axle is put in its place. This is held in place with flat washers and nuts on the outside of the two brackets. The two wheels are placed on the axle ends that extend beyond the supports, and secured with additional hardware. The new axle is made of steel. Positioning the two wheels to the outside of the tub support frame eliminates the tendency for the unit to tip sideways when being pushed and the second wheel provides additional traction. The present invention is a very helpful construction tool and a time-saver. Construction workers as well as homeowners should appreciate the benefits if offers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the united states is as follows:

1. A new and improved front wheel system for a wheelbarrow having a singular front wheel frame to increase stability and efficiency comprising, in combination:

an axle formed of a rod with a length, defined by ends of the rod external threads formed alone the entire length of the rod from end to end, the axle having a center and opposed ends, the axle received within apertures through front wheel brackets of a wheelbarrow;

cylindrical wheels secured to the axle adjacent to the ends with tires thereon for rotation the wheels are roratably mounted on the axle, the wheels positionable on opposing sides of the front wheel brackets adjacent to outer sides of a container of the wheelbarrow;

two internal bracket nuts threadedly secured to the axle on opposite sides of the center in contact with the front wheel brackets at their external faces;

two external wheel nuts threadedly secured to the axle adjacent to their ends in contact with the wheels at their external faces; and intermediate nuts between the front wheel brackets and wheels in contact with the external faces of the front wheel brackets and the internal faces of the wheels.

\* \* \* \* \*